United States Patent [19]

Cohen

[11] Patent Number: 5,065,299

[45] Date of Patent: Nov. 12, 1991

[54] POWER EXTENDABLE LAMP

[76] Inventor: Dennis A. Cohen, 6404 Wilshire Blvd., #500, Los Angeles, Calif. 90048

[21] Appl. No.: 674,780

[22] Filed: Mar. 22, 1991

[51] Int. Cl.$^5$ .................................................. F21S 1/10
[52] U.S. Cl. .................................... 362/431; 362/413
[58] Field of Search ........................ 362/431, 413, 386

[56] References Cited

U.S. PATENT DOCUMENTS

| | | |
|---|---|---|
| 3,026,409 | 3/1962 | Deisch . |
| 3,187,170 | 6/1965 | Kille . |
| 3,319,061 | 5/1967 | Pohl et al. . |
| 3,368,068 | 2/1968 | Cronheim . |
| 3,378,681 | 4/1968 | Meyer et al. . |
| 3,459,935 | 8/1969 | Bruner . |
| 3,733,478 | 5/1973 | Barker . |
| 4,300,186 | 11/1981 | Hurd ................................... 362/431 |

Primary Examiner—Carroll B. Dority
Attorney, Agent, or Firm—Charles Berman

[57] ABSTRACT

An extendable electric lamp includes a base and a hollow telescopic arm powered for movement between a contracted and an extended position. A drive cable in the arm includes embedded electrical conductors. The drive cable is operated by a motor in the base thereby extending the arm between different positions and simultaneously extending the cable between a light source at the end of the arm and a power source connected through the base.

21 Claims, 2 Drawing Sheets

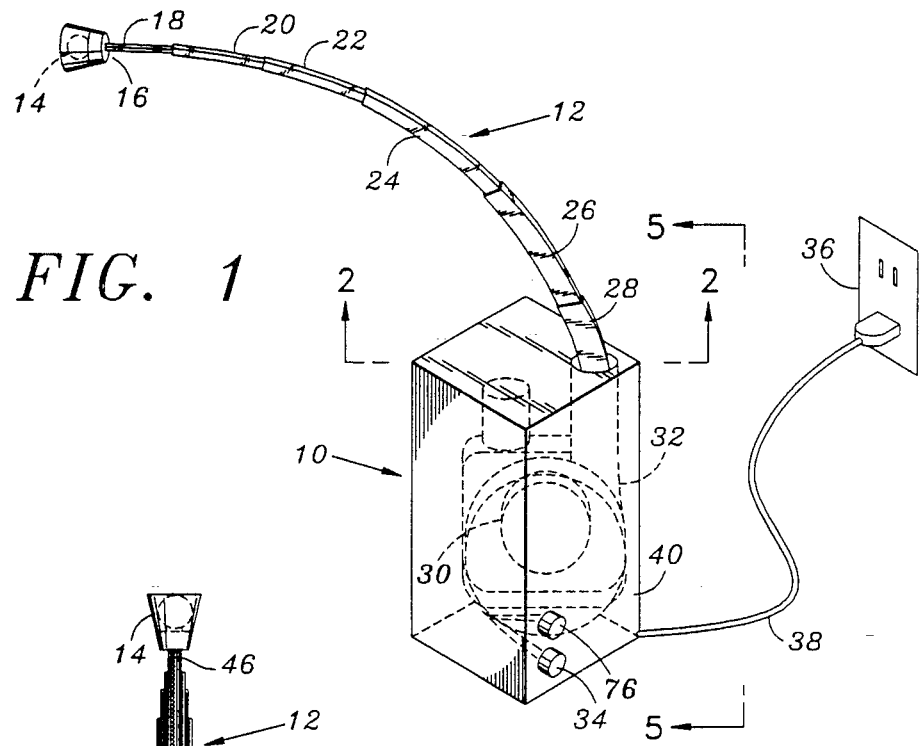
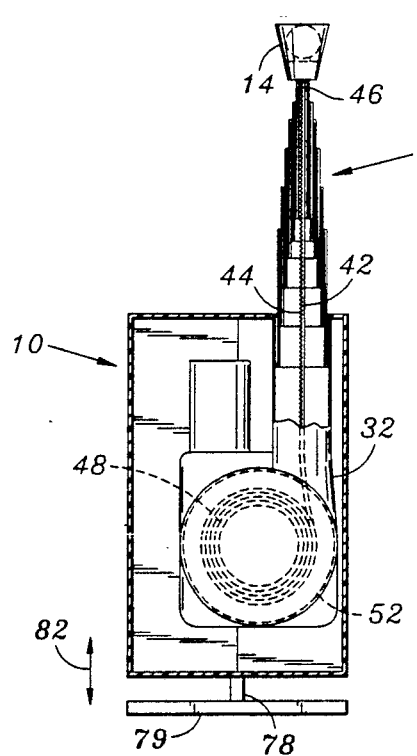
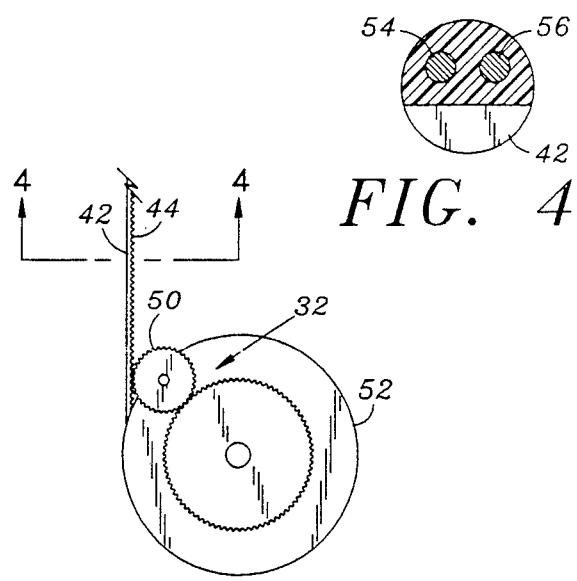
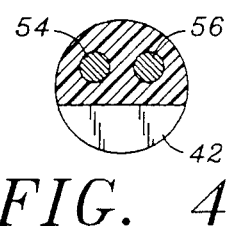
FIG. 1
FIG. 2
FIG. 3
FIG. 4

007# POWER EXTENDABLE LAMP

BACKGROUND

An adjustable light optimizes the output from a light source. This invention relates to an adjustable extendable lamp.

Many different adjustable lamps are known. Conventionally, they include a base, an arm and a light source which are relatively adjustable so as to permit focusing on a desired target area. Often the arm is articulated or there is a telescopic arm to permit the focusing or withdrawal of the light source from the target area.

The mechanisms to facilitate targeting and the retraction of the light source are not the most effective. This invention seeks to overcome the disadvantages of known lamps in this regard.

SUMMARY

An effective system for directing and withdrawing a light source from a target area is provided by this invention.

According to the invention, an extendable electric lamp comprises a base and a telescopic stem operatively extendable between a contracted position at least partly towards the base and an extended position. A light source is mounted adjacent the top of the stem. In the base, there is an electric motor and means operable by the motor for moving the stem between the extended position and the contracted position.

In a preferred form of the invention, there is a drive cable which is relatively rigid. It moves with and inside the telescopic stem. Electric conductors to supply power to the light source from a power supply which is connected with the base are imbedded within the drive cable.

In this manner, a power driven extendable stem is provided to an electric lamp thereby to facilitate the movement under power of the light source to and from a target area.

Other features of the invention are set out below with reference to the accompanying drawings and description.

DRAWINGS

FIG. 1 is a perspective view of the electric lamp in accordance with the invention.

FIG. 2 is a sectional diagonal view of the electric lamp in accordance with the invention.

FIG. 3 is a side view of the drive system for the electric lamp.

FIG. 4 is a cross-sectional end view of the drive belt and conductors of the invention.

DESCRIPTION

Figure 5:
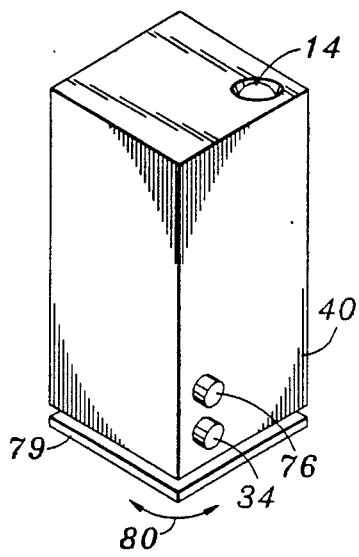
FIG. 5 illustrates a second embodiment of the invention and is a cross-sectional front view of the electric lamp in accordance with the invention.

An extendable electric lamp comprises a base 10, and a telescopic stem 12 operatively extendably between a contracted position at least partly towards the base 10 and an extended position. A light source 14 is mounted adjacent the top 16 of the stem 12.

In the first embodiment of the invention illustrated in FIGS. 1 to 4, the telescopic stem is made of component parts 18, 20, 22, 24, 26 and 28. The component parts 18, 20, 22, 24 and 26 are moveable relative to each other in a conventional telescopic fashion so that the light source 14 can be moved from a position relatively close to the base 10 and a position extended from the base 10. The component parts 18, 20, 22, 24, 26 and 28 can be fully or partly extended relatively to the base 10.

Inside the base 10, there is mounted an electric motor 30 and gear and drive means 32 operable by the motor 30 for extending the stem 12 between the extended position and the contracted position. The electric motor 30 is suitably mounted in the base 10 and is electrically connected through switch means 34 to an outside power source 36. Cable conductors 38 connect the switch means 34 to the outside power source 36. The switch means 34 is of a nature that the motor 30 can be driven forwardly or in reverse. This causes the drive means 32 to likewise move in a forward position and reverse position. Moving in the forward position, the stem 12 is driven to an extended position and moving in a rearward direction, the stem 12 is driven in a reverse direction. The switch 34 is mounted in a wall 40 of the base 10 and is thus, easily operable by a person using the lamp.

The drive means 32 includes a reel 52 about which a relatively rigid elongated drive cable 42 can be wound or unwound. Such a mechanism is similar to that used in power antennas for automobiles. In such a system, a drive cable 42 can be driven towards or away from the drive means 32 so that the component parts of a telescopic antenna can be driven upwardly or downwardly thereby to extend and retract the antenna for an automobile. The drive cable 42 includes transversely extended teeth 44 which extend from the distal end 46 to the proximal end 48 of the drive cable 42. The teeth 44 interact with engaging teeth 50 in the gear operated by the drive means 32. The drive cable 42 is wound up or withdrawn on a drive means reel.

In the drive cable 42, there are located two spaced imbedded electric conductors 54 and 56. In this manner, the material of the drive cable 42 acts as an insulator between the electrical conductors 54 and 56. The electrical conductors 54 and 56 transmit power to the light source 14 from the power source 36 remote from the base 10. At the proximal end 48, the electrical conductors 54 and 56 adjacent the drive means 32 exit from the drive reel in an electrically connecting manner so that electrical continuity is maintained between the electrical conductors 54 and 56 and the switch 76 connected between the cable 38 to the power source 36. The switch 76 can be a rheostat-type switch whereby the degree of power transmitted to the conductors 54 and 56 and hence the light source 14 can be varied as required. The light source 14 is a low power halogen-type bulb so that the power transmitted along the conductors 54 and 56 is relatively low. Such light source 14 as a halogen bulb can provide an intense light focus and distribution on a target.

Figure 6:
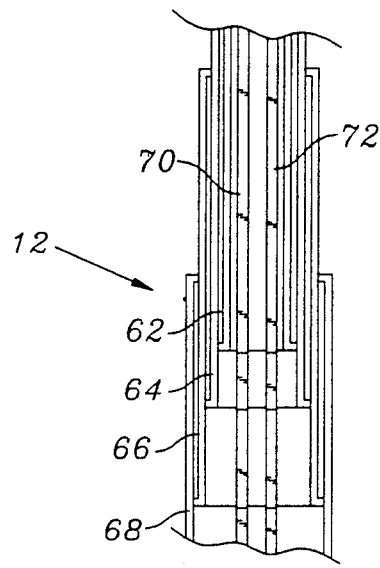
FIG. 6 is a partial view of telescopic stem members of the electric lamp in accordance with the embodiment of FIG. 5 of the invention.
Figure 7:
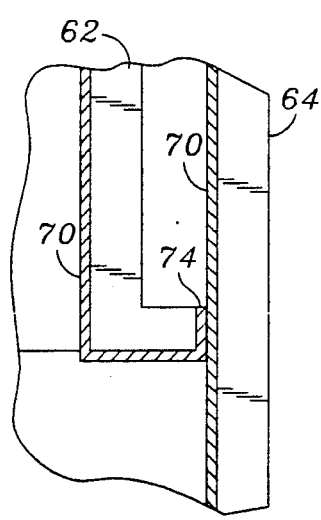
FIG. 7 is a partial side view illustrating two stem components in contact with each other.
Figure 8:
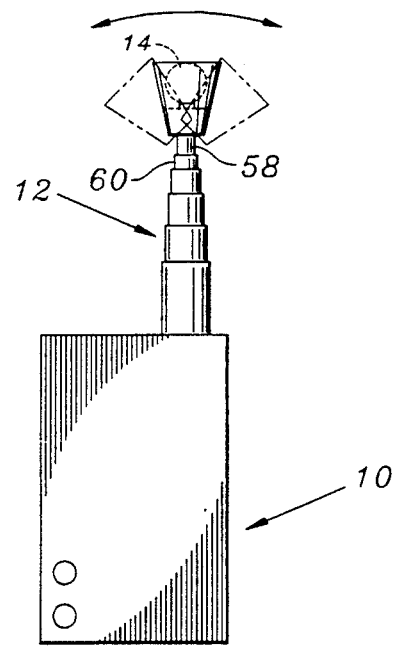
FIG. 8 is a side view of the electric lamp in accordance with the second embodiment of the invention.

In a different embodiment as illustrated in FIGS. 5 to 8, electrical conductors 70 and 72 are mounted on the inside walls of the stem components 58, 60, 62, 64, 66 and 68 of the telescopic stem 12. The electrical components are in the form of electroplated elongated strips of conductors 70 and 72 and have contacts 74 at the relative ends of the electroplated strips of the components 58 to 60, 62, 64, 66 and 68. Thus, as the components 58, 60, 62, 64, 66 and 68 move relatively between the contracted position and the extended position, the end contacts engage the electroplated strips 70 and 72 and thereby retain continuity up the stem 12 of the lamp.

The cross-section of the components 18 to 28 and 58 to 68 of the stem 12 can be any desirable shape, for instance, square, circular or other aesthetically desirable cross-section including flat or curved faces. The components 18 to 28 and 58 to 68 have a relatively different cross-sectional size relative to their adjacent components. This provides for telescopic movement relative to each other. As the components 18 to 28 or 58 to 68 move telescopically relative to each other between the retracted and extended position, so simultaneously does the electrical conductors 54 and 56 either in the drive cable 42 or as rigidly formed as components 70 and 72 in the inside wall of the components move between the extended and retracted positions.

The light source 14 can suitably swivel between the top position 16 of the stem 12 so as to permit particular focusing of the light beam from the light source on the target. Also, as illustrated in FIG. 1, the stem 12 is composed of tubular components which are relatively arcuate. Thus, the light source 14 can move from a retracted position wholly within the base 10 and a position curved and arcuately disposed relatively transversely from the base 10. In other forms such as in FIGS. 5 to 7, the stem components 58 to 68 may be relatively straight or contain at least one or more straight components. The components 18 to 28 and 58 to 68 may be mounted at a suitable angle relative to the base 10 so that the desired position of the light source 14 can be achieved.

The base 10 may be a stand-alone base so that the lamp can be a table lamp or floor lamp. The base can have any desired shape, such as curved, cylindrical or cubic or a combination of any desirable aesthetic shape. Alternatively, the base can be part of a foundation member such as a headboard for a bed or any other component or furniture or structure. The base 10 can be relatively moveable with a foundation member 79 so that different positions in a horizontal plane or even a vertical plane can be achieved. Thus, the base 10 can be rotatable about a pivot point 78 as indicated by arrow 80. Also, the base 10 could move or tilt relatively along a vertical axis as indicated by arrow 82.

In some cases, the stem 12 is fully retractable within the base 10 and in other cases, the stem 12 is only partly retractable within the base 10.

Many other forms of the invention exist, each differing from the other in matters of detail only. For instance, in some cases, the drive cable 38 may be located outside of the telescopic stem 12. In this fashion, the drive cable may be aesthetically pleasingly fashioned. Instead of teeth 44 for driving the cable 38 with the drive reel 52 of the drive means 32, other suitable mechanisms can be used to interengage the drive cable 38 with the teeth 44. Different drive mechanisms may be used with the drive means 32. In some cases, the motor may not be electrical. For instance, a hand-driven winch-type system may be used to hand-power the lamp extension and retraction.

The invention is defined solely by the appended claims.

I claim:

1. An extendable electric lamp comprising a base, a telescopic stem operatively extendable between a contracted position at least partly towards the base and an extended position, a light source mounted adjacent the top of the stem, an electric motor and means operable by the motor for extending the stem between the contracted position and extended position, an electrical conductor means longitudinally disposed with the stem and having a lower portion in the base, an upper portion of the conductor means being electrically connected to the light source, a terminal in the base for electrical connection to a power supply, the lower portion of the conductor means having a part connectable with the terminal, means for connecting the power supply to the motor, and means for selectively causing the motor to operate thereby to have the stem move between the extended and contracted positions and simultaneously cause the electric conductor means to extend or contract.

2. A lamp as claimed in claim 1 including a drive cable operable by the motor to drive the telescopic stem between the contracted position and the extended position.

3. A lamp as claimed in claim 2 wherein the telescopic stem is hollow and the drive cable is located in the stem.

4. A lamp as claimed in claim 2 wherein the conductor means is located within the drive cable.

5. A lamp as claimed in claim 3 wherein the conductor means is located within the drive cable.

6. A lamp as claimed in claim 5 wherein the conductor means includes two spaced conductors, the conductors being imbedded in the drive cable, and the drive cable constituting an insulating material between the conductors.

7. A lamp as claimed in claim 6 wherein the drive cable is a relatively rigid component, and wherein the cable includes transverse teeth, there being multiple teeth extending longitudinally between ends of the cable, there being drive means operable by the motor and wherein the teeth interengage the drive means, thereby to move the drive cable between a protracted wound position and an extended unwound position such that in the wound position, the telescopic stem is in a contracted position towards the base and in the extended position the stem is extended.

8. A lamp as claimed in claim 1 including a switch for operably driving the motor in a forward position to extend the cable and a rearward position to retract the cable.

9. A lamp as claimed in claim 8 including switch means for regulating the amount of power to the light source.

10. An extendable electric lamp as claimed in claim 1 wherein the conductor means includes conductive elements formed in the hollow stem and wherein the stem includes component parts for relative telescopic movement between each other, and wherein the conductive elements include contacts towards the end of each conductive element, the contacts being for electrical contact with adjacent conductive elements of adjacent components of the hollow stem.

11. An electric lamp as claimed in claim 10 wherein the conductor elements are electroformed parts rigidly adhering to the stem components, and wherein the stem components are made at least partly of insulating material are at least partly hollow and the conductor elements are located within the stem components.

12. An extendable lamp as claimed in claim 1 wherein in the contracted position, the extendable arm is completely withdrawn in the base.

13. A lamp as claimed in claim 10 wherein in the withdrawn position, the extendable arm is completely withdrawn the base.

14. A lamp as claimed in claim 1 wherein the extendable arm is selectively formed of straight or arcuate components.

15. A lamp as claimed in claim 10 wherein the telescopic arm is selectively formed of straight or arcuate components.

16. A lamp as claimed in claim 1 wherein the base is selectively a stand-alone element or is part of a foundation member.

17. A lamp as claimed in claim 10 wherein the base is selectively a stand-alone element or is part of a foundation member.

18. A lamp as claimed in claim 1 wherein the light source is mounted for relative swiveling movement in relation to the stem.

19. A lamp as claimed in claim 10 wherein the light source is mounted for relative swiveling movement in relation to the stem.

20. An extendable electric lamp comprising a base, a telescopic stem operatively extendable between a contracted position at least partly towards the base and an extended position, a light source mounted adjacent the top of the stem, a power means operable for extending the stem between the contracted position and extended position, an electrical conductor means longitudinally disposed with the stem and having a lower portion in the base, an upper portion of the conductor means being electrically connected to the light source, a terminal in the base for electrical connection to a power supply, the lower portion of the conductor means having a part connectable with the terminal, means for selectively operating the power means thereby to have the stem move between the extended and contracted positions and simultaneously cause the electric conductor means to extend or contract.

21. A lamp as claimed in claim 20 including a drive cable operable by the power means to drive the telescopic stem between the contracted position and the extended position, the telescopic stem being hollow and the drive cable being located in the stem, and wherein the conductor means is located within the drive cable.

* * * * *